US010404090B2

(12) United States Patent
Lee et al.

(10) Patent No.: US 10,404,090 B2
(45) Date of Patent: Sep. 3, 2019

(54) WIRELESS POWER TRANSMITTING APPARATUS AND METHOD

(71) Applicant: WITS Co., Ltd., Yongin-si, Gyeonggi-do (KR)

(72) Inventors: Sung Uk Lee, Suwon-si (KR); Tae Sung Kim, Suwon-si (KR); Si Hyung Kim, Suwon-si (KR); Hee Sun Han, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 556 days.

(21) Appl. No.: 15/045,774

(22) Filed: Feb. 17, 2016

(65) Prior Publication Data

US 2016/0315481 A1 Oct. 27, 2016

(30) Foreign Application Priority Data

Apr. 23, 2015 (KR) ........................ 10-2015-0057228

(51) Int. Cl.

| | |
|---|---|
| ***H02J 5/00*** | (2016.01) |
| ***H02J 7/02*** | (2016.01) |
| ***H02J 50/12*** | (2016.01) |
| ***H02J 50/80*** | (2016.01) |

(52) U.S. Cl.

CPC .............. *H02J 7/025* (2013.01); *H02J 50/12* (2016.02); *H02J 50/80* (2016.02)

(58) Field of Classification Search

CPC ... H04B 5/0037; H04B 5/0062; H02J 7/0047; H02J 7/045; H02J 7/025; H02J 50/12; H02J 50/80; H02J 2007/005; H02J 2007/0096; G06K 7/10237; G06K 7/10158

See application file for complete search history.

(56) References Cited

U.S. PATENT DOCUMENTS

| | | | | |
|---|---|---|---|---|
| 9,941,742 | B2 * | 4/2018 | Park | H02J 50/10 |
| 10,063,102 | B2 * | 8/2018 | Cho | H04B 5/0081 |
| 10,170,933 | B2 * | 1/2019 | Kang | H02J 17/00 |
| 2012/0306285 | A1 * | 12/2012 | Kim | H02J 17/00 307/104 |
| 2013/0058380 | A1 * | 3/2013 | Kim | H04W 76/14 375/146 |

(Continued)

FOREIGN PATENT DOCUMENTS

| | | | | |
|---|---|---|---|---|
| KR | 10-2012-0138828 A | 12/2012 | | |
| KR | 10-2013-0006363 A | 1/2013 | | |
| KR | 20130006363 A * | 1/2013 | | H02J 7/025 |

*Primary Examiner* — Jared Fureman

*Assistant Examiner* — Michael J Warmflash

(74) *Attorney, Agent, or Firm* — NSIP Law

(57) ABSTRACT

A wireless power transmitting method performed in a wireless power transmitting apparatus includes transmitting a long beacon signal via a transmitting coil; determining whether or not a response signal to the long beacon signal has been received at a wireless communicator; determining whether or not a degree of change in a level of impedance of the transmitting coil is within a reference range responsive to the determination that the response signal is not received; and wirelessly transmitting the power responsive to the determination: that the response signal has been received or that the degree of change is within the reference range.

23 Claims, 6 Drawing Sheets

(56) References Cited

U.S. PATENT DOCUMENTS

| | | | | |
|---|---|---|---|---|
| 2014/0346888 | A1* | 11/2014 | Kim | H02J 7/025 307/104 |
| 2015/0065041 | A1* | 3/2015 | Ahn | H02J 5/005 455/41.1 |
| 2016/0049825 | A1* | 2/2016 | Green | H02J 7/04 320/108 |
| 2016/0064997 | A1* | 3/2016 | Hur | H02J 7/04 320/108 |

* cited by examiner

WIRELESS POWER TRANSMITTING APPARATUS AND METHOD

CROSS-REFERENCE TO RELATED APPLICATION(S)

This application claims the benefit of Korean Patent Application No. 10-2015-0057228 filed on Apr. 23, 2015 in the Korean Intellectual Property Office, the entire disclosure of which is incorporated herein by reference for all purposes.

BACKGROUND

1. Field

The following description relates to a wireless power transmitting apparatus and method.

2. Description of Related Art

In accordance with the development of wireless technology, various functions such as the transmission of data and the transmission of electrical power may be provided. Recently, a wireless power transmitting technology capable of charging electronic devices with power, even in a non-contact state, has been developed.

Wireless power transmitting technology may allow for power charging without a physical connection existing between the electronic device and a charging device. Therefore, wireless power transmitting technology has been variously applied due to the convenience and high degree of freedom in power charging offered thereby.

Meanwhile, various wireless charging standards have been established for wireless power transmission. In terms of wireless charging standards, both a wireless charging standard that uses a separate short-range wireless communication signal at the time of wirelessly transmitting power (such as the Alliance for Wireless Power (A4WP) standard, for example) and a wireless charging standard that does not use a separate short-range wireless communication signal at the time of wirelessly transmitting power (such as the Wireless Power Consortium (WPC) standard, for example) have been applied.

Because of the use of such standards, currently, wireless charging is not able to be performed between devices using different wireless charging standards.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a wireless power transmitting method performed in a wireless power transmitting apparatus includes transmitting a long beacon signal via a transmitting coil; determining whether or not a response signal to the long beacon signal has been received at a wireless communicator; determining whether or not a degree of change in a level of impedance of the transmitting coil is within a reference range responsive to the determination that the response signal is not received; and wirelessly transmitting the power responsive to the determination: that the response signal has been received or that the degree of change is within the reference range.

The determining of whether or not the response signal to the long beacon signal has been received may include opening a short-range wireless communication channel; and determining whether or not the response signal has been received through the short-range wireless communication channel.

The determining of whether or not the response signal to the long beacon signal has been received may further include determining whether the response signal is received through the short-range wireless communication channel within a preset time from a point in time in which the long beacon signal is transmitted.

The determining of whether or not the degree of change in the level of impedance of the transmitting coil is within the reference range may include determining whether the degree of change in the level of impedance exceeds the reference range when a first sensed voltage obtained from a current following in the transmitting coil exceeds a first maximum voltage level.

The determining of whether or not the degree of change in the level of impedance of the transmitting coil is within the reference range may include determining whether the degree of change in the level of impedance exceeds the reference range when a second sensed voltage obtained from an output current of a power transmitter exceeds a second maximum voltage level.

The determining of whether or not the degree of change in the level of impedance of the transmitting coil is within the reference range may include determining whether the degree of change in the level of impedance exceeds the reference range when a first sensed voltage obtained from a current following in the transmitting coil exceeds a first maximum voltage level or a second sensed voltage obtained from an output current of a power transmitter exceeds a second maximum voltage level.

The wireless power transmitting may further include stopping the transmission of the power when the first sensed voltage obtained from the current following in the transmitting coil exceeds an overcurrent protection level.

The wireless power transmitting may further include stopping the transmission of the power when the second sensed voltage obtained from the output current of the power transmitter exceeds an overcurrent protection level.

The wireless power transmitting may further include, after the wireless transmitting of the power to a wireless power receiving apparatus, stopping the transmission of the power when the first sensed voltage obtained from the current following in the transmitting coil is lower than a first minimum voltage level.

The wireless power transmitting may further include, after the wireless transmitting of the power to a wireless power receiving apparatus, stopping the transmission of the power when the second sensed voltage obtained from the output current of the amplifying circuit is lower than a second minimum voltage level.

According to another general aspect, a wireless power transmitting apparatus includes a resonator including a transmitting coil configured to radiate wireless power; a power transmitter connected to the transmitting coil and configured to perform a switching operation to actuate the transmitting coil and wirelessly transmit a long beacon signal or power; a detector configured to detect a first voltage sensed in a current flowing in the transmitting coil; and a controller configured to control the power transmitter to wirelessly transmit power responsive to a determination that a response signal to the long beacon signal is not received and that the first sensed voltage is within a reference range.

The wireless power transmitting apparatus may further include a wireless communicator configured to form a short-range wireless communication channel together with a wireless power receiving apparatus, and wherein the response signal to the long beacon signal is received through the short-range wireless communication channel.

The controller may be further configured to determine that the response signal is not received when the response signal is not received through the short-range wireless communication channel within a preset time from a point in time in which the long beacon signal is transmitted.

The controller may be further configured to control the power transmitter to transmit the power according to a first wireless charging standard that uses the short-range wireless communication channel when the response signal to the long beacon signal has been received.

The controller may be further configured to control the power transmitter to transmit the power according to a second wireless charging standard that does not use the short-range wireless communication channel during a time in which the first sensed voltage is within the reference range when the response signal to the long beacon signal is not received.

The resonator may include an LC resonance tank including the transmitting coil and a capacitor, the power transmitter may include first and second switches connected to each other in series to form a loop together with a voltage source, and the detector may include a sensing resistor having one end connected to a connection contact between the first and second switches and the other end connected to one end of the LC resonance tank.

According to another general aspect, a wireless power transmission apparatus includes a power supply; a power transmitter operably coupled to the power supply and configured to radiate wireless power; a controller operably coupled to at least one of the power supply or the power transmitter, the controller configured: to monitor for both: a change in an electrical characteristic of the power transmitter, and a received communications signal, and to selectively actuate the power supply to supply power to the power transmitter responsive to a determination that an electrical characteristic of the resonator is within a predetermined range or to reception of the communications signal.

The wireless power transmission apparatus may further include a wireless communicator, wherein the power transmitter may be further configured to radiate a periodic short beacon signal, and the controller may be further configured, responsive to a detected change in impedance during radiation of the short beacon signal, to radiate a long beacon signal to actuate the wireless communicator to request identification from a wireless power receiver via a separate short range wireless communication channel.

The controller may be further configured to initiate wireless power radiation from the power transmitter by a first wireless power protocol responsive to a received identification from the wireless power receiver, and to initiate wireless power radiation by a second wireless power protocol responsive to a changed electrical characteristic of the power transmitter continuously monitored by the controller.

The controller may be further configured to initiate the power transmitter to radiate wireless power to the wireless power receiver via an Alliance For Wireless Power (A4WP) wireless power protocol responsive to the received identification from the wireless power receiver via a Bluetooth protocol, and to initiate wireless power radiation via a Wireless Power Consortium (WPC) wireless power protocol responsive to both a determined absence of an identification of the wireless power receiver and a change in impedance in the wireless power transmitter during the long beacon signal.

Other features and aspects will be apparent from the following detailed description, the drawings, and the claims.

BRIEF DESCRIPTION OF THE DRAWINGS

The above and other aspects, features and other advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
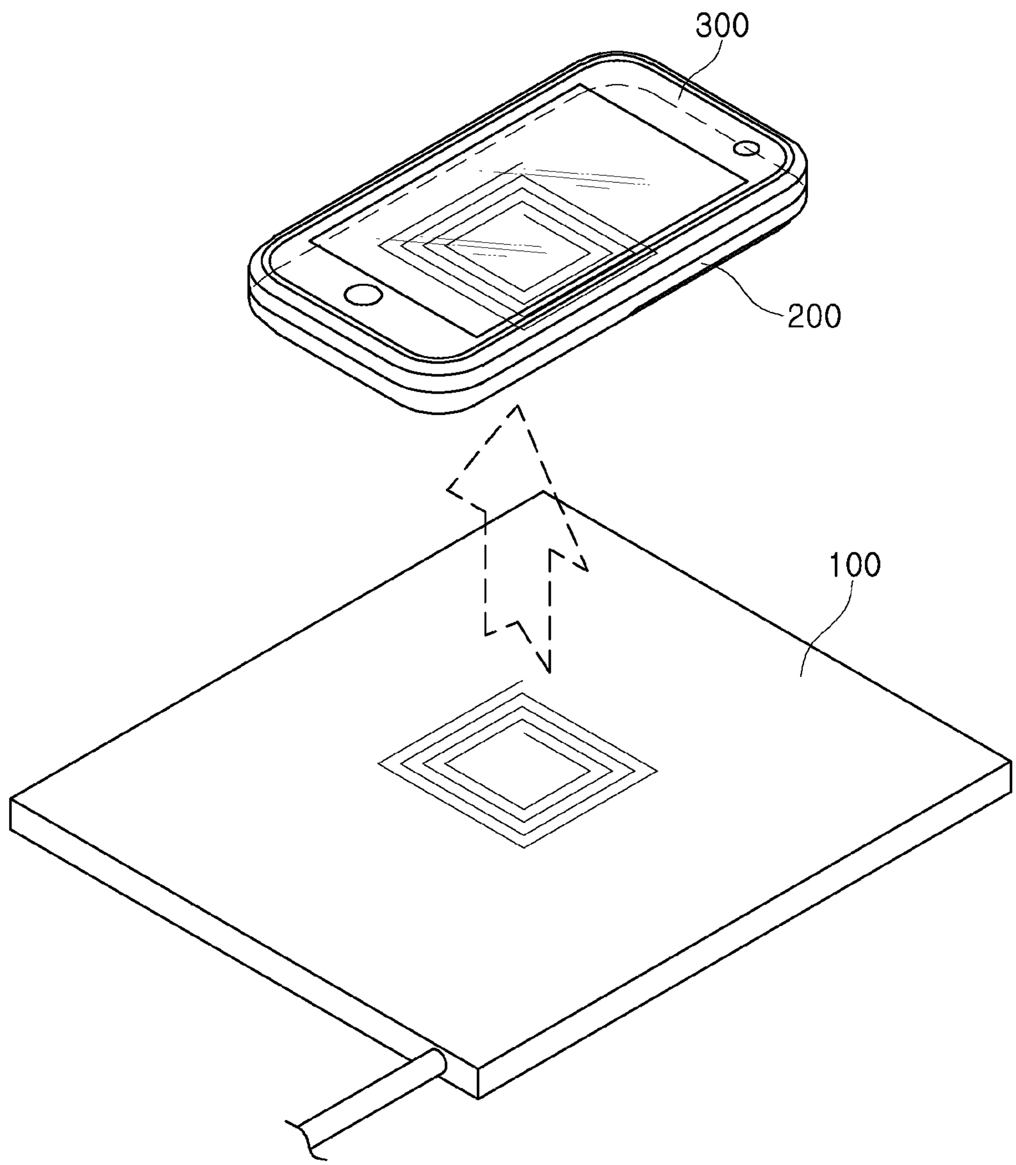
FIG. 1 is a view illustrating examples of a wireless power transmitting apparatus and a wireless power receiving apparatus according to an exemplary embodiment.

FIG. 1 is a view illustrating examples of a wireless power transmitting apparatus and a wireless power receiving apparatus according to an exemplary embodiment.

As illustrated FIG. 1, a wireless power transmitting apparatus 100 wirelessly provides power to a wireless power receiving apparatus 200. The wireless power receiving apparatus 200 supplies the wirelessly received power to an electronic device 300.

The wireless power transmitting apparatus 100 includes a transmitting coil. The transmitting coil may resonate with a receiving coil of the wireless power receiving apparatus 200 to provide a wireless power to the receiving coil. Although a case in which the wireless power transmitting apparatus 100 includes one transmitting coil has been illustrated, this is only one example, and the wireless power transmitting apparatus 100 may also include a plurality of transmitting coils.

The wireless power transmitting apparatus 100 may wirelessly transmit the power to the wireless power receiving apparatus 200 regardless of a wireless charging standard supported by the wireless power receiving apparatus 200.

For example, in a case in which the wireless power receiving apparatus 200 supports a wireless charging standard (for example, Alliance for Wireless Power (A4WP)) that uses a short-range wireless communication signal at the time of wirelessly charging power, the wireless power transmitting apparatus 100 may provide the wireless power according to the corresponding wireless charging standard. In addition, even in a case in which the wireless power receiving apparatus 200 supports a wireless charging standard (for example, Wireless Power Consortium (WPC), or the like) that does not use the short-range wireless communication signal at the time of wirelessly charging the power, the wireless power transmitting apparatus 100 may provide the wireless power according to the corresponding wireless charging standard.

Herein, various methods of performing wireless communications at dose range are collectively termed short-range wireless communications. Thus, the present disclosure does not particularly limit a frequency or signal scheme of short-range wireless communications. For example, techniques such as BLUETOOTH® version 1-4.2+(e.g. IEEE 802.15 using, for example, about 2.4 to about 2.485 GHz), ZIGBEE® (IEEE 802.15.4), ultra wide band (UWB), Wi-Fi (e.g. IEEE 802.11a\b\g\n\ac High Rate), RFID, NFC, Infrared IR, and any other suitable technique which may be used for short-range wireless communications. While various exemplary close or short range communication schemes have been described above, the terms “close” or “short range” with respect to communication schemes may have an altogether different meaning with respect to wireless power transmission. Effective distances for the wireless transmission of power generally are based on frequency, reception and transmission antenna size and orientation and are generally much shorter than effective distances for wireless communication.

Hereinafter, the wireless power transmitting apparatus 100 will be described in more detail with reference to FIGS. 2 through 8.

Figure 2:
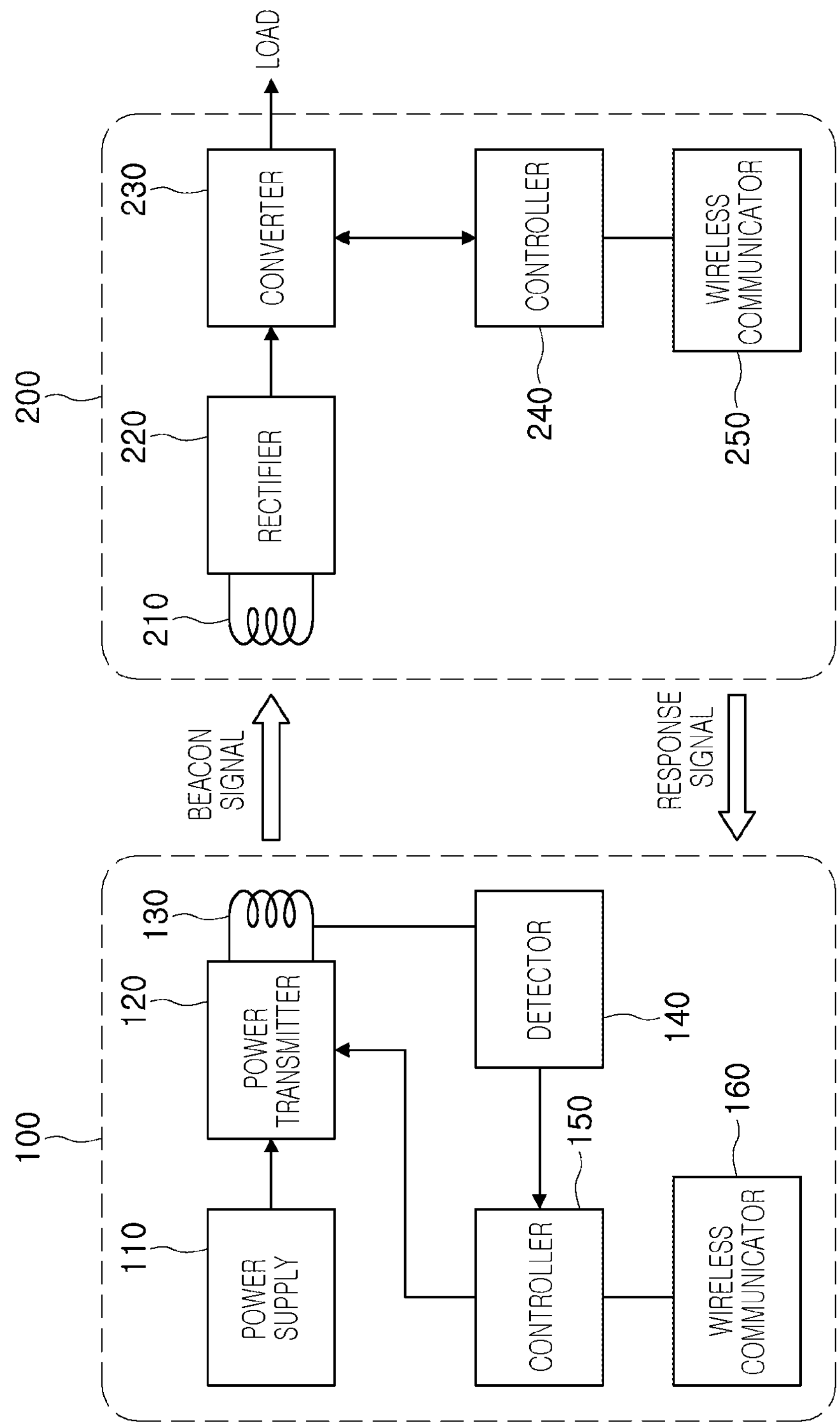
FIG. 2 is a block diagram illustrating a wireless power transmitting apparatus and the wireless power receiving apparatus according to an exemplary embodiment.

FIG. 2 is a block diagram illustrating the wireless power transmitting apparatus and the wireless power receiving apparatus according to an exemplary embodiment.

Referring to FIG. 2, the wireless power transmitting apparatus 100 may include a power transmitter 120, a resonator 130, a detector 140, a controller 150, and a wireless communicator 160. According to exemplary embodiments, the wireless power transmitting apparatus 100 may further include a power supply 110.

The power supply 110 supplies powers to respective components of the wireless power transmitting apparatus 100. For example, the power supply 110 may be a power supply receiving a commercial alternating current (AC) power, converting the commercial AC power into direct current (DC) powers, and providing the DC powers to respective components of the wireless power transmitting apparatus 100.

The power transmitter 120 may be connected to a transmitting coil of the resonator 130 and control the transmitting coil to wirelessly transmit a beacon signal (a short beacon signal or a long beacon signal) or power.

In an exemplary embodiment, the power transmitter 120 may include a plurality of switches. The plurality of switches may provide a current to the transmitting coil through a switching operation to allow the transmitting coil to provide the beacon signal or the power to the wireless power receiving apparatus 200.

The resonator 130 may include the transmitting coil. The transmitting coil may be magnetically coupled to a receiving coil of the wireless power receiving apparatus 200 to transmit the beacon signal (the short beacon signal or the long beacon signal) or wirelessly transmit the power.

The detector 140 may detect a voltage sensed in the current.

In an exemplary embodiment, the detector 140 may detect a first voltage sensed in the current flowing in the transmitting coil. In the present exemplary embodiment, the controller 150 may determine a degree of change in a level of impedance of the transmitting coil using a degree of change of the first sensed voltage.

In another exemplary embodiment, the detector 140 may detect a second voltage sensed in an output current of the power transmitter 120. In the present exemplary embodiment, the controller 150 may determine a degree of change in a level of impedance of the transmitting coil using a degree of change of the second sensed voltage.

The controller 150 may control a switching operation of the power transmitter 120.

The controller 150 may control a switching operation of the power transmitter 120 such that the power transmitter 120 may transmit a short beacon signal or a long beacon signal. For example, the controller 150 may control the power transmitter 120 to transmit the short beacon signal in a standby state. When changes in impedance of the short beacon signal are detected, the controller 150 may control the power transmitter 120 to transmit the long beacon signal. For example, detecting changes in impedance in the short beacon signal means that an object is approaching the wireless power transmitting apparatus 100. Thus, the wireless power transmitting apparatus 100 may transmit a long beacon signal to confirm whether the approaching object is the wireless power receiving apparatus 200, based on a wireless charging standard using short-range wireless communications.

The controller 150 may confirm whether or not a response signal to the long beacon signal has been received from the wireless power receiving apparatus 200 through the wireless communicator 160.

In an exemplary embodiment, the controller 150 may determine that the response signal is not received when the response signal is not received through the wireless communicator 160 within a preset time from a point in time in which the long beacon signal is transmitted.

When the response signal has been received, the controller 150 may control the power transmitter 120 to transmit the wireless power according to the wireless charging standard (the A4WP standard for example) that uses the short-range wireless communication at the time of wirelessly charging the power.

Meanwhile, when the response signal is not received, the controller 150 may determine the degree of change in the level of impedance of the transmitting coil and control the power transmitter 120 to transmit the wireless power according to the wireless charging standard (the WPC standard for example) that does not use the short-range wireless communication at the time of wirelessly charging the power when the degree of change in the level of impedance is in a predetermined range. That is, when the degree of change in the level of impedance is in the predetermined range, the transmitting coil of the resonator 130 and the receiving coil of the wireless power receiving apparatus 200 may be in a state in which they may be magnetically coupled to each other at a predetermined level or more. Therefore, the controller 150 may determine that an object adjacent to the wireless power transmitting apparatus 100 is not a simple object, but is the wireless power receiving apparatus 200, when the degree of change in the level of impedance is in the predetermined range.

As a result, when the response signal to the long beacon signal is not received, but the degree of change in the level of impedance of the transmitting coil is in the predetermined range, the object adjacent to the wireless power transmitting apparatus 100 will be the wireless power receiving apparatus 200 supporting the wireless charging standard (the WPC standard for example) that does not use the short-range wireless communication. Therefore, the controller 150 may control the power transmitter 120 to transmit the wireless power according to the wireless charging standard (the WPC standard for example) that does not use the short-range wireless communication at the time of wirelessly charging the power.

In an exemplary embodiment, the controller 150 may determine the degree of change in the level of impedance of the transmitting coil based on the sensed voltage detected in the detector 140. The controller 150 may determine whether the degree of change in the level of impedance of the transmitting coil is within a reference range, and allow the power to be wirelessly transmitted to the wireless power receiving apparatus 200 when the degree of change is within the reference range.

For example, the controller 150 may determine that the degree of change in the level of impedance of the transmitting coil is in a predetermined range when the sensed voltage is in a preset range. The reason is that a large current amount of the transmitting coil or a large output current amount of the power transmitter 120 connected to the transmitting coil is induced in a case in which the impedance of the transmitting coil is rapidly changed.

That is, it may be confirmed through the sensed voltage whether or not a current amount of the transmitting coil or an output current amount of the power transmitter 120 connected to the transmitting coil is in a predetermined range, and when the current amount of the transmitting coil or the output current amount of the amplifying circuit of the power transmitter 120 connected to the transmitting coil is in the predetermined range, the degree of change in the level of impedance is a predetermined level or less, such that wireless charging may be possible.

Therefore, the controller 150 may control the power transmitter 120 to transmit the power according to a second wireless charging standard that does not use the short-range wireless communication during a time in which the response signal to the long beacon signal is not received and the sensed voltage belongs to the reference range.

In an exemplary embodiment, the controller 150 may allow the power not to be transmitted or allow the transmission of the power to be stopped when the sensed voltage detected in the detector 140 exceeds an overcurrent protection level. The controller 150 may store overcurrent protection levels set to be different from each other depending on a position at which the sensed voltage is detected.

In an exemplary embodiment, the controller 150 may stop the transmission of the power when power having a predetermined level or above is charged in the wireless power receiving apparatus 200 during a time in which the power is being wirelessly transmitted. That is, in a case in which the power of the predetermined level or more is charged in the wireless power receiving apparatus 200, the current of the transmitting coil of the resonator 130 or the output current of the power transmitter 120 may be decreased.

Therefore, the controller 150 may control the power transmitter 120 to stop the transmission of the power when the first sensed voltage obtained from the current flowing in the transmitting coil of the resonator 130 is lower than a first minimum voltage level during a time at which the power is being wirelessly transmitted to the wireless power receiving apparatus 200.

Alternatively, the controller 150 may control the power transmitter 120 to stop the transmission of the power when the second sensed voltage obtained from the output current of the power transmitter 120 is lower than a second minimum voltage level during a time at which the power is being wirelessly transmitted to the wireless power receiving apparatus 200.

The controller 150 may include a processing unit. According to exemplary embodiments, the controller 150 may further include a memory. Here, the processing unit may include, for example, a central processing unit (CPU), a graphic processing unit (GPU), a microprocessor, an application specific integrated circuit (ASIC), a field programmable gate arrays (FPGA), or the like, and have a plurality of cores. The memory may be a volatile memory (for example, a random access memory (RAM), or the like), a non-volatile memory (for example, a read only memory (ROM), a flash memory, or the like), or a combination thereof.

The wireless communicator 160 may form a short-range wireless communication channel together with the wireless power receiving apparatus 200. For example, the wireless communicator 160 may form a Bluetooth communication channel together with the wireless power receiving apparatus 200.

In FIG. 2, the wireless power receiving apparatus 200 supporting the wireless charging standard (the A4WP standard for example) that uses the short-range wireless communication at the time of wirelessly charging the power is illustrated.

The wireless power receiving apparatus 200 may include a resonator 210 including the receiving coil. Power induced through the resonator 210 may be rectified through a rectifier 220, be converted by a converter 230, and be then provided to a load. A controller 240 may control an operation of the rectifier 220 or the converter 230, and transmit a response signal to the long beacon signal to the short-range wireless communication channel using a wireless communicator 250 in a case in which the long beacon signal has been received.

In addition to the wireless power receiving apparatus 200 supporting a first wireless charging standard (such as the A4WP standard for example) that uses the short-range wireless communication, another type of wireless power receiving apparatus 200 supporting a second wireless charging standard different than the first (such as the WPC standard for example) that does not use the short-range wireless communication may also receive the power from the wireless power transmitting apparatus 100.

Figure 3:
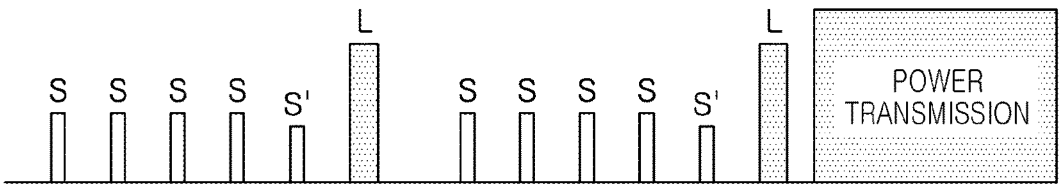
FIG. 3 is a view illustrating an example of a beacon signal transmitted from the wireless power transmitting apparatus according to an exemplary embodiment.

FIG. 3 is a view illustrating an example of beacon signals transmitted from the wireless power transmitting apparatus according to an exemplary embodiment. The beacon signals illustrated in FIG. 3 may be transmitted through the resonator 130.

Referring to FIG. 2 and FIG. 3, the wireless power transmitting apparatus 100 may periodically transmit short beacon signals S. When a change in the current flowing in the transmitting coil transmitting a short beacon signal S' is generated, it may mean that an object approaches the wireless power transmitting apparatus 100. Therefore, the controller 150 controls the power transmitter 120 to transmit a long beacon signal L when a sensed voltage for a transmitting coil current provided from the detector 140 is changed.

Then, the controller 150 may confirm whether or not a response signal to the long beacon signal L has been received through the wireless communicator 160, and confirm the degree of change in the level of impedance of the transmitting coil as described above when the response signal is not received, thereby determining whether or not to wirelessly transmit the power. In a case in which the response signal is not received and the degree of change in the level of impedance is within a predetermined range or more, an object adjacent to the wireless power transmitting apparatus 100 may not be the wireless power receiving apparatus 200. Therefore, in this case, the controller 150 may control the power transmitter 120 to again transmit a short beacon signal S after a predetermined time.

Meanwhile, the controller 150 may control the power transmitter 120 to wirelessly transmit the power through the wireless charging standard (the WPC standard for example) that does not use the short-range wireless communication when the response signal to the long beacon signal L has been received through the wireless communicator 160 or when the degree of change in the level of impedance of the transmitting coil is in the predetermined range even though the response signal is not received.

Figure 4:
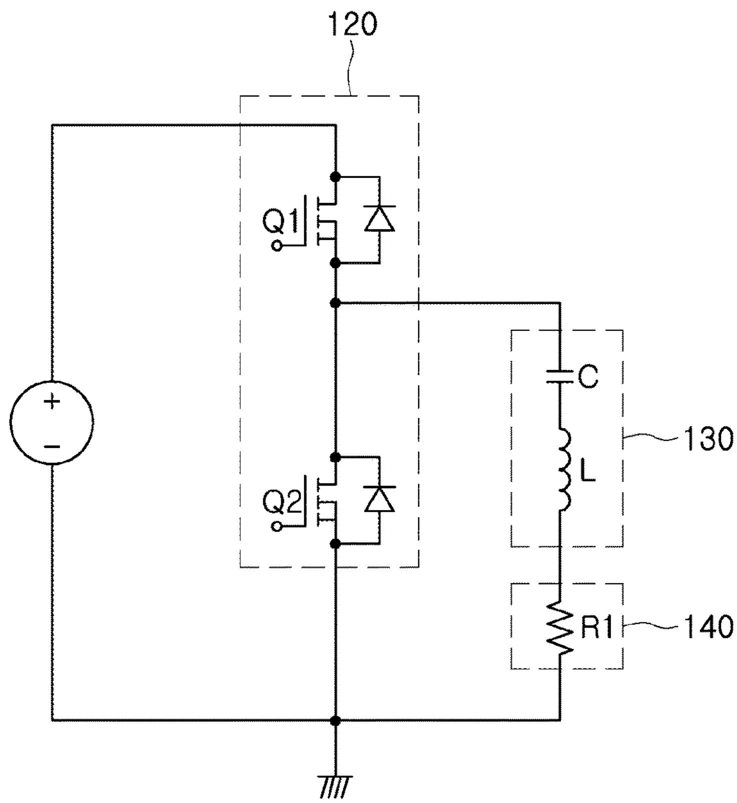
FIG. 4 is a circuit diagram illustrating an example of a power transmitter or a detector of FIG. 3 according to an exemplary embodiment.
Figure 5:
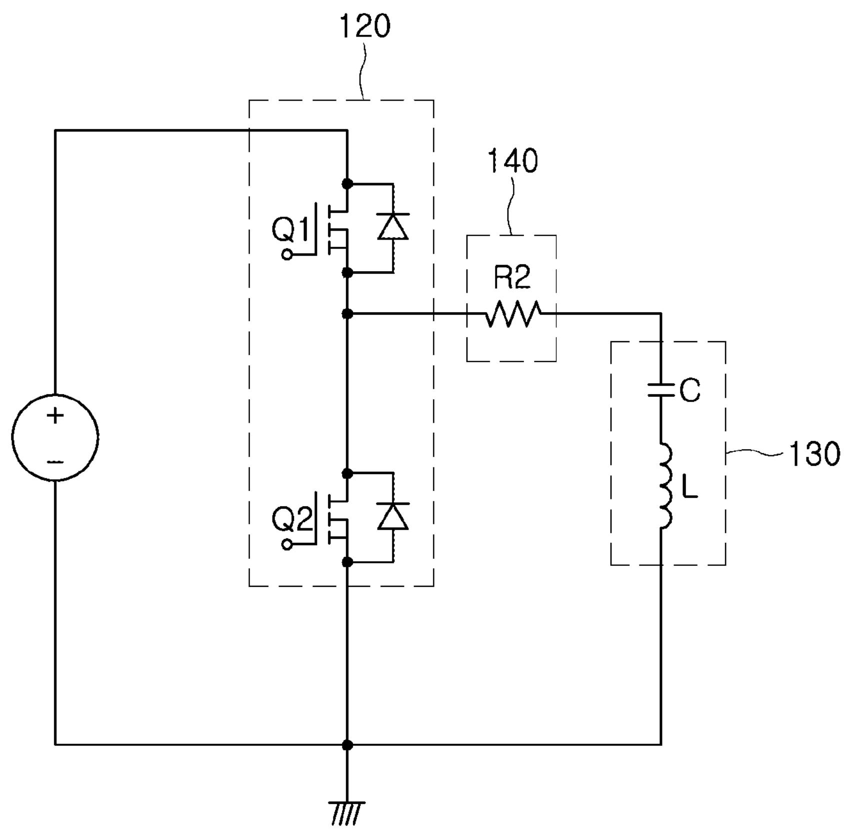
FIG. 5 is a circuit diagram illustrating another example of a power transmitter or a detector of FIG. 3 according to another exemplary embodiment.
Figure 6:
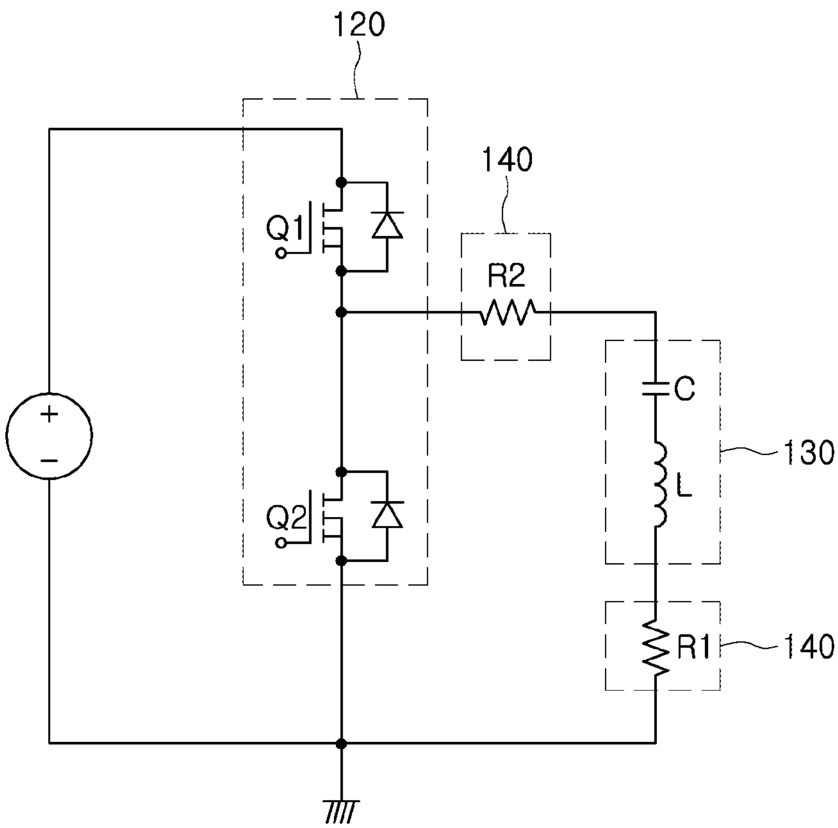
FIG. 6 is a circuit diagram illustrating another example of a power transmitter or a detector of FIG. 3 according to another exemplary embodiment.

FIGS. 4 through 6 are circuit diagrams illustrating examples of a power transmitter or a detector of FIG. 3 according to an exemplary embodiment in the present disclosure.

Referring to FIG. 2 and FIGS. 4 through 6, the resonator 130 includes an LC resonance tank including a transmitting coil L and a capacitor C.

The power transmitter 120 includes first and second switches Q1 and Q2 connected to each other in series. The first and second switches Q1 and Q2 are connected to each other in series to form a loop together with a voltage source. The second switch Q2 is connected to the resonance tank in parallel.

The first and second switches Q1 and Q2 may be alternately switched to allow the resonance tank to resonate using power of the voltage source.

The detector 140 includes a sensing resistor. Examples illustrated in FIGS. 4 through 6 may be distinguished from each other depending on a position of the detector 140.

In an example illustrated in FIG. 4, the detector 140 includes a first sensing resistor R1 having one end connected to one end of the second switch Q2 and the other end connected to one end of the resonance tank. The detector 140 may detect the voltage sensed in the current flowing in the transmitting coil L using the first sensing resistor R1.

In an example illustrated in FIG. 5, the detector 140 includes a second sensing resistor R2 having one end connected to a connection contact between the first and second switches Q1 and Q2 and the other end connected to one end of the resonance tank. The detector 140 may detect the voltage sensed in the output current of the power transmitter 120 using the second sensing resistor R2.

In an example illustrated in FIG. 6, the detector 140 may include both the first sensing resistor R1 and the second sensing resistor R2. In the present example, when a first sensed voltage detected in the first sensing resistor R1 is outside of a predetermined range or a second sensed voltage detected in the second sensing resistor R2 is outside of a predetermined range, the controller 150 may determine that the impedance of the transmitting coil is outside of a predetermined range and perform controlling so that the power is not transmitted.

Figure 7:
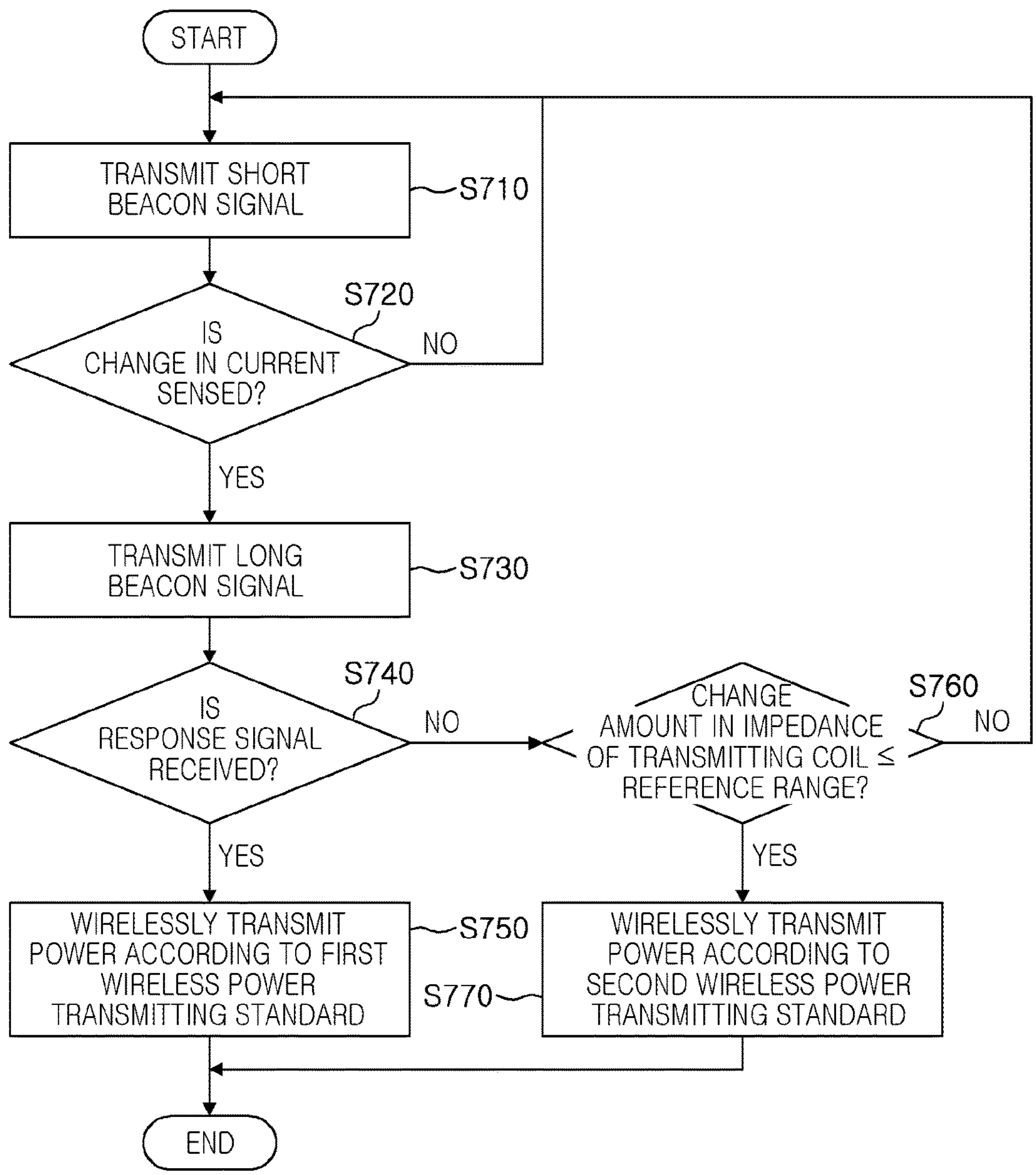
FIG. 7 is a flow chart illustrating a wireless power transmitting method according to an exemplary embodiment.

FIG. 7 is a flow chart illustrating a wireless power transmitting method according to an exemplary embodiment in the present disclosure. A wireless power transmitting method to be described below with reference to FIG. 7 may be performed in the wireless power transmitting apparatus 100 described above with reference to FIGS. 1 through 6. Therefore, descriptions of contents the same as or corresponding to the contents described above will be omitted in order to avoid an overlapped description. However, contents that are the same as or correspond to the contents described above may be easily understood from the contents described above with reference to FIGS. 1 through 6.

Referring to FIG. 7, the wireless power transmitting apparatus 100 may transmit the short beacon signal (S710).

The wireless power transmitting apparatus 100 may sense a change in the current of the transmitting coil transmitting the short beacon signal or the power transmitter 120 (S720), and again transmit the short beacon signal at a predetermined period (S710) when the change is not sensed (NO of S720).

The wireless power transmitting apparatus 100 may transmit the long beacon signal (S730) when the change is sensed (YES of S720).

The wireless power transmitting apparatus 100 may determine whether or not the response signal to the long beacon signal has been received (S740), and wirelessly transmit the power according to the wireless charging standard (the A4WP standard for example) that uses the short-range wireless communication at the time of wirelessly charging the power (S750) when the response signal has been received (YES of S740).

Meanwhile, the wireless power transmitting apparatus 100 may determine whether or not the degree of change in the level of impedance of the transmitting coil is within the reference range (S760) when the response signal is not received (NO of S740).

The wireless power transmitting apparatus 100 may wirelessly transmit the power to the wireless power receiving apparatus according to the wireless charging standard (the WPC standard for example) that does not use the short-range wireless communication at the time of wirelessly charging the power (S770) when the degree of change is within the reference range (YES of S760).

Meanwhile, the wireless power transmitting apparatus may again transmit the short beacon signal after a predetermined time (S710), when the degree of change is outside of the reference range (NO of S760).

In an example of S740, the wireless power transmitting apparatus 100 may determine whether or not the response signal to the long beacon signal has been received through the short-range wireless communication channel. For example, the wireless power transmitting apparatus 100 may open the short-range wireless communication channel and determine whether or not the response signal has been received through the short-range wireless communication channel.

In an example of S740, the wireless power transmitting apparatus 100 may determine that the response signal is not received when the response signal is not received through the short-range wireless communication channel within a preset time from a point in time in which the long beacon signal is transmitted.

In an example of S760, the wireless power transmitting apparatus 100 may confirm the degree of change in the level of impedance of the transmitting coil using the current flowing in the transmitting coil. For example, the wireless power transmitting apparatus 100 may determine that the degree of change in the level of impedance exceeds the reference range when the first sensed voltage obtained from the current flowing in the transmitting coil exceeds a first maximum voltage level.

In another example of S760, the wireless power transmitting apparatus 100 may confirm the degree of change in the level of impedance of the transmitting coil using the output current of power transmitter 120. For example, the wireless power transmitting apparatus 100 may determine that the degree of change in the level of impedance exceeds the reference range when the second sensed voltage obtained from the output current of the power transmitter 120 exceeds a second maximum voltage level.

In another example of S760, the wireless power transmitting apparatus 100 may confirm the degree of change in the level of impedance of the transmitting coil using the current flowing in the transmitting coil and the output current of the power transmitter 120. For example, the wireless power transmitting apparatus 100 may determine that the degree of change in the level of impedance exceeds the reference range when the first sensed voltage obtained from the current flowing in the transmitting coil exceeds the first maximum voltage level or the second sensed voltage obtained in the case that the output current of the power transmitter 120 exceeds the second maximum voltage level.

In an exemplary embodiment, the wireless power transmitting apparatus 100 may perform a protecting operation against an overcurrent.

As an example, the wireless power transmitting apparatus 100 may stop the transmission of the power when the first sensed voltage obtained from the current flowing in the transmitting coil exceeds the overcurrent protection level.

As another example, the wireless power transmitting apparatus 100 may stop the transmission of the power when the second sensed voltage obtained from the output current of the power transmitter 120 exceeds the overcurrent protection level.

In an exemplary embodiment, the wireless power transmitting apparatus 100 may stop the transmission of the power depending on a charged level of the wireless power receiving apparatus 200.

As an example, the wireless power transmitting apparatus 100 may stop the transmission of the power when the first sensed voltage obtained from the current flowing in the transmitting coil is lower than the first minimum voltage level after it wirelessly transmits the power to the wireless power receiving apparatus 200.

As another example, the wireless power transmitting apparatus 100 may stop the transmission of the power when the second sensed voltage obtained from the output current of the power transmitter 120 is lower than the second minimum voltage level after it wirelessly transmits the power to the wireless power receiving apparatus 200.

The apparatuses, units, modules, devices, and other components (e.g., the power supply 110, power transmitter 120, controller 150, detector 140, wireless communicator 160, rectifier 220, converter 230, controller 240) illustrated in FIGS. 2 and 4-6 that perform the operations described herein with respect to FIGS. 3-7 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer.

Hardware components implemented by a processor or computer execute instructions or software, such as an operating system (OS) and one or more software applications that run on the OS, to perform the operations described herein with respect to FIGS. 2-7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both.

In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 7 that performs the operations described herein may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, an electronic device 300 as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

As set forth above, according to exemplary embodiments in the present disclosure, the wireless charging standard that does not use the NFC signal may be supported even in the wireless charging standard that uses the NFC signal.

While exemplary embodiments have been shown and described above, it will be apparent to those skilled in the art that modifications and variations could be made without departing from the scope of the present invention as defined by the appended claims.

What is claimed is:

1. A wireless power transmitting method of a wireless power transmission apparatus, comprising:
- transmitting a long beacon signal by a transmission coil;
- determining whether a response signal to the transmitted long beacon signal has been received by the wireless power transmission apparatus; and
- in response to the determination of whether the response signal has been received indicating that the response signal has not been received,
  - determine whether a variation in a level of impedance of the transmission coil is within a reference range, and
  - wirelessly transmit power responsive to the variation being determined to be within the reference range.

2. The wireless power transmitting method of claim 1, wherein the determining of whether the response signal to the long beacon signal has been received comprises:
- opening a short-range wireless communication channel; and
- determining whether the response signal has been received through the short-range wireless communication channel.

3. The wireless power transmitting method of claim 2, wherein the determining of whether the response signal to the long beacon signal has been received further comprises determining whether the response signal is received through the short-range wireless communication channel within a preset time from a point in time in which the long beacon signal is transmitted.

4. The wireless power transmitting method of claim 1, wherein the determining of whether the variation in the level of impedance of the transmission coil is within the reference range comprises determining whether the variation in the level of impedance exceeds the reference range when a first sensed voltage obtained from a current following in the transmission coil exceeds a first maximum voltage level.

5. The wireless power transmitting method of claim 1, wherein the determining of whether the variation in the level of impedance of the transmission coil is within the reference range comprises determining whether the variation in the level of impedance exceeds the reference range when a second sensed voltage obtained from an output current of a power transmitter exceeds a second maximum voltage level.

6. The wireless power transmitting method of claim 1, wherein the determining of whether the variation in the level of impedance of the transmission coil is within the reference range comprises determining whether the variation in the level of impedance exceeds the reference range when a first sensed voltage obtained from a current following in the transmission coil exceeds a first maximum voltage level or a second sensed voltage obtained from an output current of a power transmitter exceeds a second maximum voltage level.

7. The wireless power transmitting method of claim 4, further comprising stopping the transmission of the power when the first sensed voltage obtained from the current following in the transmission coil exceeds an overcurrent protection level.

8. The wireless power transmitting method of claim 5, further comprising stopping the transmission of the power when the second sensed voltage obtained from the output current of the power transmitter exceeds an overcurrent protection level.

9. The wireless power transmitting method of claim 4, further comprising, after the wireless transmitting of the power to a wireless power receiving apparatus, stopping the transmission of the power when the first sensed voltage obtained from the current following in the transmission coil is lower than a first minimum voltage level.

10. The wireless power transmitting method of claim 5, further comprising, after the wireless transmitting of the power to a wireless power receiving apparatus, stopping the transmission of the power when the second sensed voltage obtained from the output current of the amplifying circuit is lower than a second minimum voltage level.

11. A wireless power transmission apparatus, comprising:

a resonator including a transmission coil configured to radiate wireless power;

a power transmitter connected to the transmission coil and configured to perform a switching operation to actuate the transmission coil and wirelessly transmit a long beacon signal or power;

a detector configured to detect a first voltage sensed in a current flowing in the transmission coil; and a controller configured to control the power transmitter to wirelessly transmit power responsive to a determination that a response signal to the long beacon signal is not received and that the first sensed voltage is within a reference range.

12. The wireless power transmission apparatus of claim 11, further comprising a wireless power transmission apparatus configured to form a short-range wireless communication channel together with a wireless power receiving apparatus, and wherein the response signal to the long beacon signal is received through the short-range wireless communication channel.

13. The wireless power transmission apparatus of claim 12, wherein the controller is configured to determine that the response signal is not received when the response signal is not received through the short-range wireless communication channel within a preset time from a point in time in which the long beacon signal is transmitted.

14. The wireless power transmission apparatus of claim 12, wherein the controller is configured to control the power transmitter to transmit the power according to a first wireless charging standard that uses the short-range wireless communication channel when the response signal to the long beacon signal has been received.

15. The wireless power transmission apparatus of claim 14, wherein the controller is configured to control the power transmitter to transmit the power according to a second wireless charging standard that does not use the short-range wireless communication channel during a time in which the first sensed voltage is within the reference range when the response signal to the long beacon signal is not received.

16. The wireless power transmission apparatus of claim 11, wherein the resonator includes an LC resonance tank including the transmission coil and a capacitor, the power transmitter includes first and second switches connected to each other in series to form a loop together with a voltage source, and the detector includes a sensing resistor having one end connected to a connection contact between the first and second switches and the other end connected to one end of the LC resonance tank.

17. A wireless power transmission apparatus, comprising:

a power supply;

a power transmitter operably coupled to the power supply and configured to radiate wireless power;

a controller operably coupled to at least one of the power supply or the power transmitter, the controller configured to:

monitor for both:

a change in an electrical characteristic of the power transmitter, and a received communications signal, and selectively actuate the power supply to supply power to the power transmitter responsive to a determination that an electrical characteristic of the resonator is within a predetermined range or to reception of the communications signal, wherein responsive to the determination that the electrical characteristic of the resonator is within the predetermined range or the reception of the communications signal, radiate a long beacon signal to actuate a wireless communicator to request identification from a wireless power receiver from a separate short range wireless communication channel.

18. The wireless power transmission apparatus of claim 17, wherein the power transmitter is further configured to radiate a periodic short beacon signal, and the controller is further configured, responsive to a detected change in impedance during radiation of the short beacon signal, to radiate the long beacon signal to actuate the wireless communicator to request identification from the wireless power receiver by the separate short range wireless communication channel.

19. The wireless power transmission apparatus of claim 18, wherein the controller is further configured to initiate wireless power radiation from the power transmitter by a first wireless power protocol responsive to a received identification from the wireless power receiver, and to initiate wireless power radiation by a second wireless power protocol responsive to a changed electrical characteristic of the power transmitter continuously monitored by the controller.

20. The wireless power transmission apparatus of claim 19, wherein the controller is further configured to initiate the power transmitter to radiate wireless power to the wireless power receiver by an Alliance For Wireless Power (A4WP) wireless power protocol responsive to the received identification from the wireless power receiver by a Bluetooth protocol, and to initiate wireless power radiation by a Wireless Power Consortium (WPC) wireless power protocol responsive to both a determined absence of an identification of the wireless power receiver and a change in impedance in the wireless power transmitter during the long beacon signal.

21. A wireless power transmitting method of a wireless power transmission apparatus, comprising:

transmitting a first signal by a transmission coil;

determining a first impedance variation in the transmission coil indicating remote receipt of the transmitted first signal;

transmitting, responsive to a result of the determination of the first impedance variation, a second signal by the transmission coil;

determining a second impedance variation in the transmission coil indicating remote receipt of the transmitted second signal;

determining whether the second signal has been received;

wirelessly transmitting power in accordance with a first wireless charging standard when the determination of whether the second signal has been received indicates that the second signal has been received; and wirelessly transmitting power in accordance with a second wireless charging standard, when the determination of whether the second signal has been received indicates that the second signal has not been received and the second impedance variation has been determined to be within a reference range.

22. The wireless power transmitting method of claim 21, wherein the first signal is a short beacon signal and the second signal is a long beacon signal.

23. The wireless power transmitting method of claim 21, wherein the first wireless charging standard is an Alliance for Wireless Power (A4WP) standard and the second wireless charging standard is a Wireless Power Consortium (WPC) standard.

* * * * *